(12) United States Patent
Ames et al.

(10) Patent No.: US 8,010,220 B1
(45) Date of Patent: Aug. 30, 2011

(54) SYNCHRONOUS AND OPTIMUM LINE DELIVERY UTILIZING TACT INFORMATION

(75) Inventors: Ryan Christopher Ames, Greensburg, IN (US); John Campbell, East Liberty, OH (US); Yozo Handa, Mie (JP); David Wayne Hicks, Shelbyville, IN (US); Hiroshi Kawaguchi, Indianapolis, IN (US); Joseph P. Lewis, Indianapolis, IN (US); Masahiko Minamikawa, Columbus, IN (US); Steven Michael Swank, Springfield, OH (US); Toshihide Tanaka, Indianapolis, IN (US); Yasushi Nagura, Indianapolis, IN (US)

(73) Assignees: Honda Motor Co., Ltd., Tokyo (JP); Midwest Express Inc., East Liberty, OH (US)

( * ) Notice: Subject to any disclaimer, the term of this patent is extended or adjusted under 35 U.S.C. 154(b) by 521 days.

(21) Appl. No.: 12/240,852

(22) Filed: Sep. 29, 2008

(51) Int. Cl.
*G06F 19/00* (2006.01)
*B60P 1/04* (2006.01)
*G07B 15/02* (2006.01)

(52) U.S. Cl. ......... 700/119; 700/113; 414/467; 235/384

(58) Field of Classification Search .................. 235/384; 414/467; 700/112
See application file for complete search history.

(56) References Cited

U.S. PATENT DOCUMENTS

| | | | | |
|---|---|---|---|---|
| 3,394,945 A * | 7/1968 | Steier et al. | ............. | 280/33.994 |
| 3,801,176 A * | 4/1974 | Higbee | ......................... | 312/199 |
| 4,683,540 A | 7/1987 | Kurosu et al. | | |
| 4,829,445 A * | 5/1989 | Burney | ......................... | 700/230 |
| 4,951,574 A * | 8/1990 | Tsuneda | ....................... | 104/295 |
| 5,189,624 A * | 2/1993 | Barlow et al. | ................. | 700/169 |
| 5,528,489 A | 6/1996 | Asahara et al. | | |
| 5,778,386 A * | 7/1998 | Lin et al. | .............................. | 1/1 |
| 6,141,598 A | 10/2000 | Nam | | |
| 6,698,655 B2 | 3/2004 | Kondo et al. | | |
| 6,705,523 B1 * | 3/2004 | Stamm et al. | ................. | 235/385 |
| 6,813,539 B2 | 11/2004 | Morimoto et al. | | |
| 6,854,583 B1 * | 2/2005 | Horn | ............................. | 198/348 |
| 6,975,915 B2 * | 12/2005 | Robitaille et al. | ............ | 700/108 |
| 7,010,373 B2 | 3/2006 | Fukushima et al. | | |
| 7,151,123 B2 * | 12/2006 | Ramsey | .......................... | 522/96 |
| 7,416,196 B2 * | 8/2008 | Brown | ....................... | 280/79.11 |

(Continued)

OTHER PUBLICATIONS

Burkhard et al., "Evaluating and Improving the Security of RFID Tags in Shipping Containers", Jul. 2007, Metrans Project AR 06-01, Final Report. 36 pages.*

(Continued)

*Primary Examiner* — Ramesh B Patel
*Assistant Examiner* — Thomas Stevens
(74) *Attorney, Agent, or Firm* — Standley Law Group LLP

(57) ABSTRACT

A parts delivery management system and method that synchronizes production line side parts deliveries with a production schedule to facilitate delivering the right part to the right production line location at the right time. A consolidation center for receiving parts from suppliers is co-located with an assembly plant. Parts are received in returnable containers and organized for line side delivery according to the manufacturer's production schedule. Parts are delivered to production line locations using multi-cart "trains" that transport parts to the locations. Trains made of multiple carts are assembled throughout the production day and loaded with containers holding the parts that are then delivered line side. A delivery management system application executing on a computer receives production schedule data as well as part and container data to determine which parts are needed throughout the day at the various production line side locations and when they are needed.

18 Claims, 8 Drawing Sheets

U.S. PATENT DOCUMENTS

| | | | |
|---|---|---|---|
| 7,722,307 B2 * | 5/2010 | Bell .............................. | 414/268 |
| 7,782,194 B2 * | 8/2010 | Stawar et al. ............ | 340/539.13 |
| 2004/0195803 A1 * | 10/2004 | Brown .......................... | 280/504 |
| 2004/0243262 A1 * | 12/2004 | Hofmann ........................ | 700/91 |
| 2005/0133340 A1 * | 6/2005 | Horn .............................. | 198/348 |
| 2005/0149414 A1 * | 7/2005 | Schrodt et al. ................... | 705/29 |
| 2006/0074778 A1 | 4/2006 | Katou et al. | |
| 2006/0163350 A1 * | 7/2006 | Melton et al. ................. | 235/435 |
| 2006/0244588 A1 * | 11/2006 | Hannah et al. ........... | 340/539.13 |
| 2007/0228142 A1 | 10/2007 | Yamaguchi | |
| 2008/0103622 A1 * | 5/2008 | Hanses et al. ................. | 700/116 |
| 2008/0210268 A1 * | 9/2008 | Metheny et al. ............. | 134/95.2 |

OTHER PUBLICATIONS

Cooke et al., "A Practical Model of Heineken's Bottle Filling Line with Dependent Failures", 2004, Elsevier, European Journal of Operation Research, p. 491-504.*

Hamann et al., The Impact of Air Flow Leakage on Server Inlet Air Temperature in Raised Floor Data Center, 2008, IBM p. 1153-1160.*

Kempfer-L.-M., Productivity by the Cartload (automatic-guided vehicle carts). 2006, Material Handling Management, Penton Media, pp. 62-64.*

Feare-T., Delivering for Delphi (Automotive Parts Manufacture), 2000, Modern Materials Handling, 3 pages.*

* cited by examiner

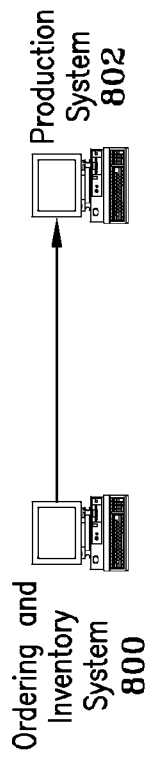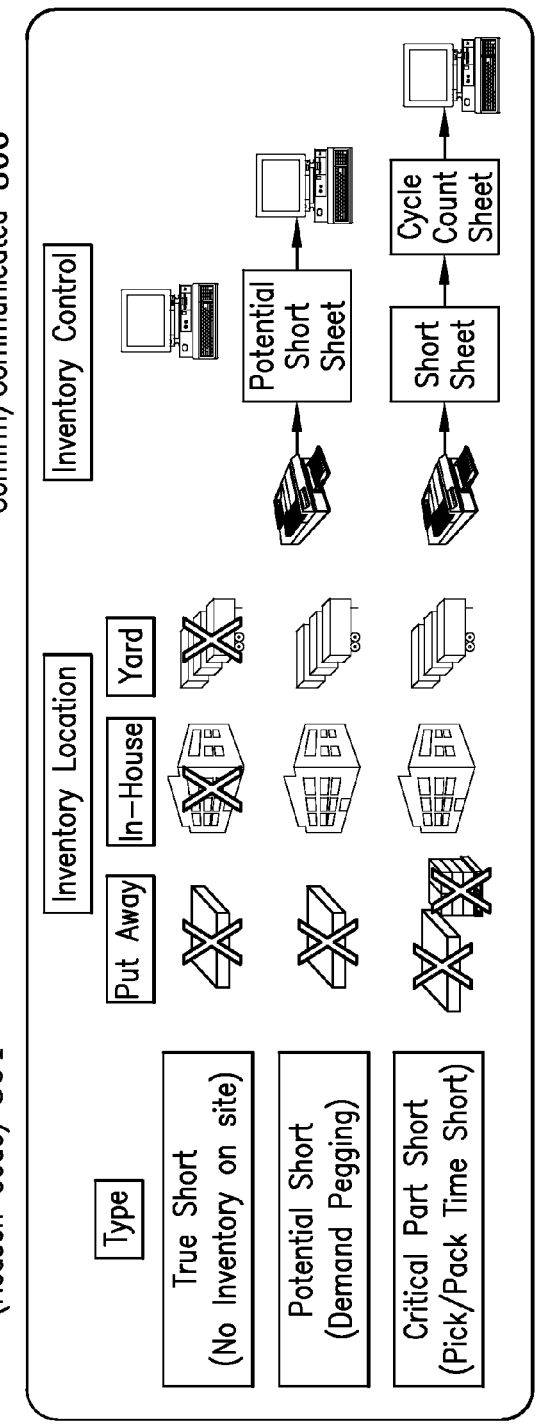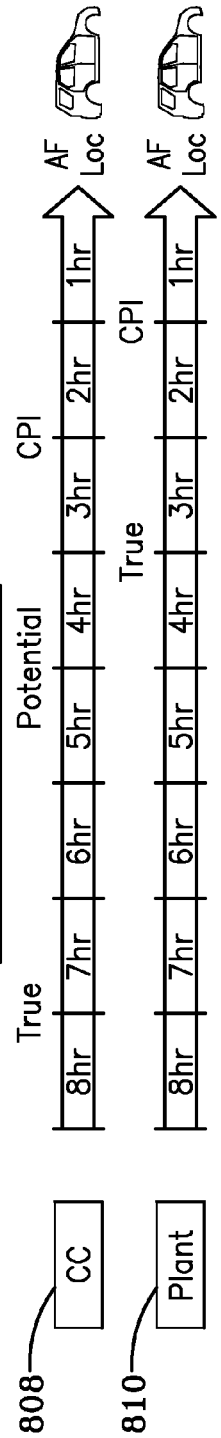
FIG-8

SYNCHRONOUS AND OPTIMUM LINE DELIVERY UTILIZING TACT INFORMATION

CROSS-REFERENCE TO RELATED APPLICATIONS

None.

FIELD OF THE INVENTION

The present invention relates to parts delivery management for assembly plants. More particularly, the present invention relates to a computerized parts delivery management system and method that synchronizes production line side parts deliveries with a manufacturer's production schedule.

BACKGROUND OF THE INVENTION

To keep production lines moving, manufacturers require delivery of the right part to the right place at the right time. In conventional production lines such as automotive assembly lines, parts are added or assembled on to a partially assembled product as it passes by assembly stations or areas on the production line. Associates working on the production line add parts and complete assembly processes as may be required to build a product meeting a particular set of specifications. A production schedule usually determines which manufacturer products will be built on a particular day or other production period and therefore, dictates which parts or components are needed on the production line so associates can complete the assembly tasks at the assembly stations or areas. If an associate at an assembly station does not have the right parts at the right time, accommodations to the production process must be made. The product may be held or diverted to another location while attempts are made to locate the appropriate parts. Production slows or worse, may be halted entirely, as time is spent locating the appropriate part or parts to complete the necessary assembly tasks.

Manufacturers and logistics providers devote considerable resources to developing systems and methods to facilitate delivery of parts to production line locations so that production runs smoothly. Currently, there are essentially two methods that automobile manufacturers use to supply parts to the automotive production assembly line. In one method, the production plan or schedule is used to order parts that are received from internal production departments and suppliers. The parts are temporarily held and then supplied to the production line. In a second method, parts received from the internal production departments and suppliers are repacked into a kit for easy assembly, held for up to a day, then supplied to the production line.

Some manufacturers maintain inventories of parts at their facilities and use a variety of delivery techniques get parts from inventory to production line locations when a need for replenishment is determined. For example, when the line side supply of a particular part at a particular location drops below a threshold, a replenishment method may be used in which an associate drives a vehicle loaded with the low inventory part to the particular production line location. Other manufacturers respond to replenishment requests using automated guided vehicles that deliver parts to assembly line locations based on directional information programmed into the vehicles.

Various right part, right place, right time (RPT) production methods have been developed to reduce costs attributable to maintaining replenishment inventories. RPT techniques involve coordinating the delivery of parts to the manufacturer's assembly plant as well as to "line side" locations in an effort to reduce inventory levels and, consequently, costs. Some manufacturers have incorporated parts consolidation centers into their RPT practices. Consolidation centers are facilities where parts are received from suppliers, staged for use in one or more assembly plants (i.e., organized according to the order in which they will be consumed), and then transported from the consolidation center to an assembly plant where they are consumed. In an effort to control costs, suppliers may be asked to deliver parts to the consolidation center in conjunction with the manufacturer's production schedule and to provide parts in full truck loads rather than partial truck loads. Typically, the consolidation centers are physically separated from the manufacturer's assembly plants and are designed to service multiple plants.

Another practice that many manufacturers have incorporated into their RPT practices is to use returnable containers. The returnable containers are used to receive parts from suppliers, to stage parts for use in production, and to deliver parts line side for use in production. The empty returnable containers are then returned to the suppliers for use in subsequent shipments of parts to the manufacturer. The use of "standardized packaging" for all parts received from the suppliers as well as for use in staging and delivering parts reduces costs. Because the containers conform to certain specifications and requirements, equipment for transporting, handling, and managing the containers can also be standardized. The "standardized" returnable container solution is more cost effective than one that uses many sizes and types of packaging as well as related equipment for transporting, handling, and managing the containers.

Although the use of physically separated consolidation centers and returnable containers and the related practices of staging containers (and therefore, parts) within consolidation centers helps to reduce inventory and associated costs, the process of transporting the containers from the consolidation centers to the assembly plants and then to the production line side locations where the parts within the containers are used can be costly. In some instances, it may be necessary for delivery vehicles to make hundreds of trips during a production day or other time period to transport parts from the consolidation center to the assembly plant.

There are other factors that impact the ability to deliver the right part to the right location at the right time. Parts management is becoming more complex due to 1) global procurement; 2) diversified small lot repacking; 3) assembly methods for better productivity and workability; and 4) complexity for avoiding non-conforming parts. Despite the complexities, on the assembly line, completion of work in a short amount of time without mistakes is still sought. Varying delivery schedules for parts from suppliers can also make line side deliveries challenging. Many parts are received randomly on multiple days, or perhaps, over weeks and/or months, but are needed on the production line in a set order, often within a few minutes prior to use, and in the appropriate packaging form. Mistakes may be reduced by having the necessary parts when needed, and furthermore, never having parts or carts on the line side that could hinder or interfere with productivity, workability, or quality. From a part delivery, repacking, and supply stand point, these requirements are at odds.

The automotive industry has been experiencing significant change recently and has a need for designs and processes that allow it to supply a large quantity of vehicles in a short period of time. Flexibility is needed to allow the industry to meet the consumer demand of "purchasing the vehicle on an as needed basis." Simultaneously, there is a need to manage a wide variety of vehicle types and points.

Before supplying parts to a production line, it is important to assess which process or processes are in need of the parts, the quantity of parts needed to be delivered, and the configuration of the parts. Next, it is important to make the deliveries over certain intervals as well as efficiently using the delivery vehicles for best service, delivery, and energy conservation. All these variables should be considered before a delivery is made.

There is a need for a parts delivery management system that reduces costs associated with physically independent consolidation centers. There is a need for a parts delivery management system that furthers the goal of delivering the right part to the right production line location at the right time and in a cost effective manner. There is a need for a parts delivery management system and method that synchronizes production line side parts deliveries with a production schedule to further the goal of delivering the right part is delivered to the right production line location at the right time. There is a need for a parts delivery management system that supports classification control and work standards, and that facilitates procuring the necessary parts to the assembly line with the right timing, relieving the assembly associate from needing to search for and control the inventory.

SUMMARY OF THE INVENTION

The present invention is a parts delivery management system and method that synchronizes production line side parts deliveries with a production schedule to further the goal of delivering the right part to the right production line location at the right time. In an example embodiment, a consolidation center for receiving parts from suppliers is co-located with an assembly plant. Parts are received in returnable containers and organized for line side delivery according to the manufacturer's production schedule. Parts are delivered to production line side locations using multi-cart "trains" that transport parts to the locations. A plurality of cart types is used to accommodate different types of returnable containers. Trains consisting of a plurality of carts are assembled throughout the production day or time period and loaded with containers holding the parts that are then delivered line side. Trains are reconfigured throughout the day or production time period so that parts are delivered when needed to the appropriate production line locations.

The system and method of the present invention is computer implemented. A delivery management system application executing on a computer receives manufacturer production schedule data as well as part and container data to determine which parts are needed throughout the day or production time period at the various production line side locations and when they are needed. Lead times for delivering parts to different line side locations are determined and used in configuring carts for each train that transports the parts. Trains consisting of a plurality of carts are configured in a terminal area of the consolidation center, loaded with containers holding the needed parts, and dispatched to multiple locations on the production line where the carts and containers are dropped. The empty carts are picked up from the locations, returned to the terminal, and reconfigured for additional parts deliveries to the production line. For each parts delivery, the production demand for parts determines which containers and therefore, which carts are needed for a particular train.

The use of reconfigurable trains comprising a plurality of carts to deliver parts from a consolidation center to production line locations results in several benefits over prior art methods. They facilitate a "flow" of parts to the production line and as a result, minimize the amount of time that parts are held at the consolidation center. Parts delivery data is collected and analyzed throughout the delivery process thereby allowing the Logistics Provider to respond quickly to potential problems such as parts shortages. Information about the parts deliveries is also communicated to the Logistics Provider's inventory management, parts ordering management, and production control systems to ensure the accuracy of information maintained and stored in other computer systems and to ensure that parts are ordered and delivered to the consolidation center to meet production demand.

BRIEF DESCRIPTION OF THE DRAWINGS

FIG. 8 is a schematic for a short parts operation according to an example embodiment of the present invention.

DETAILED DESCRIPTION

Figure 1:
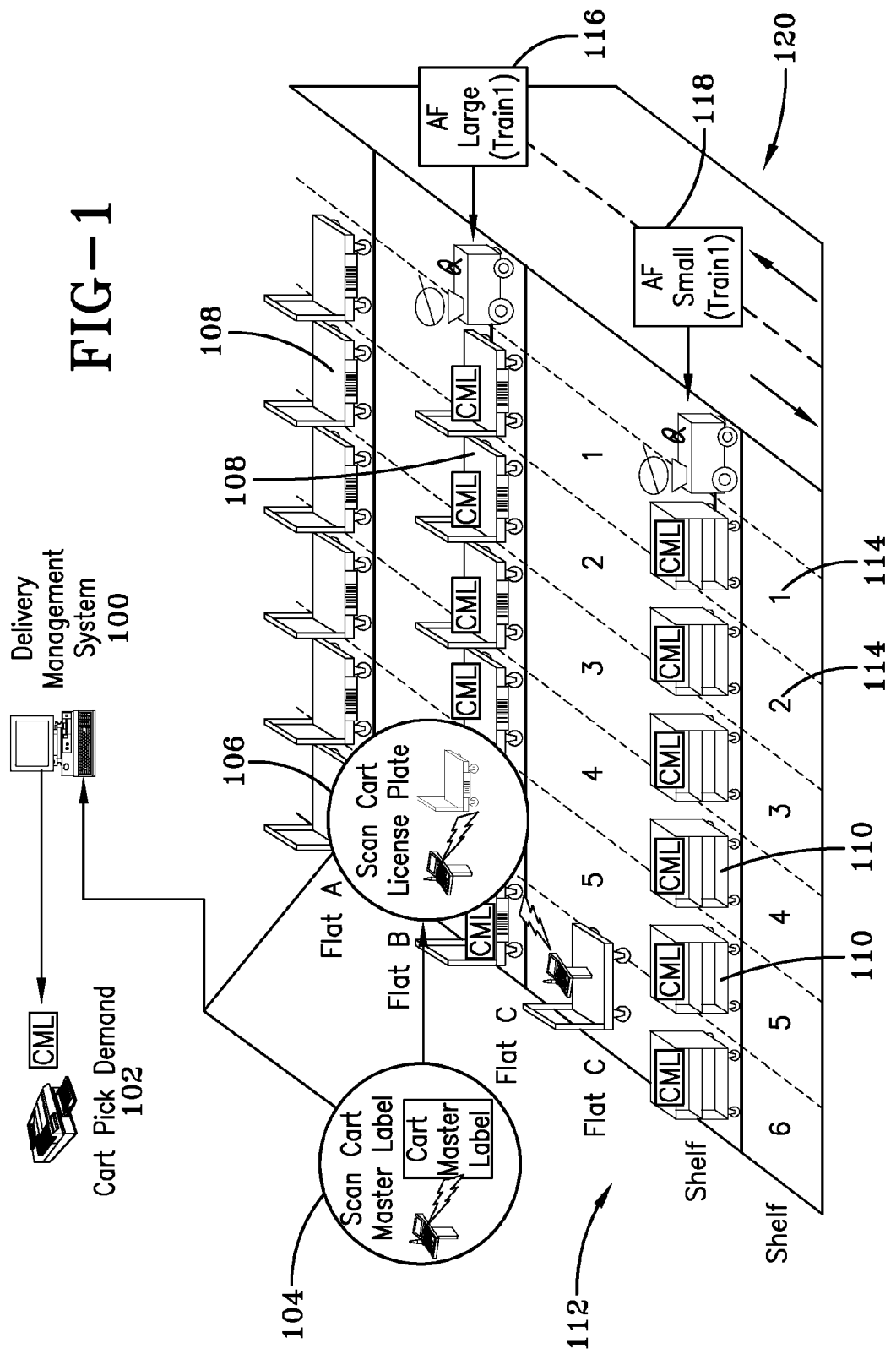
FIG. 1 is a diagram illustrating configuration of trains for parts delivery according to an example embodiment of the present invention.

Referring to FIG. 1, a diagram illustrating configuration of trains for parts delivery according to an example embodiment of the present invention is shown. Parts received at a consolidation center in returnable containers are organized for loading onto carts that are attached or linked together to form a train. The returnable containers have bar code labels that provide information about the parts held in the container. The bar code labels facilitate the selection and tracking of containers loaded on the parts delivery train carts throughout the day or production time period.

An area within the consolidation center 120 serves as a terminal where trains are configured with a plurality of carts to deliver parts to line side locations on a production line. A plurality of "tuggers" or transporters are deployed, each of which is assigned to a plurality of carts designed to transport containers holding parts. Different types of carts 112 (e.g., shelf, flat A, flat B, flat C), each of which accommodates a particular type of container, may be deployed for parts deliveries to the production line. For example, shelf carts may have multiple shelves 110 for carrying small bins of parts. Other carts may be essentially flat 108 with variations in size, shape, and other features to accommodate different types of large containers. Each cart has an attachment or linking mechanism that allows it to be attached or linked to another cart. The cart types used to build the parts delivery trains may be selected according to the needs of the manufacturer. In an example embodiment, trains of up to seven carts are configured for parts delivery.

Cart types can be mixed on trains and the number of carts on a train may vary according to parts demand as determined by the production schedule. Each cart has a bar code "license plate" that uniquely identifies it. The cart license plates 106 are scanned to facilitate tracking and use of the carts within the consolidation center and assembly plant and to confirm that deliveries are made to the correct production line side locations. The terminal may have visual indicators on the floor and in other locations to define train and cart lanes 114 that facilitate dynamic linking of carts.

A delivery management system (DMS) application executing on a computer 100 provides features and functionality for determining how parts delivery trains should be configured throughout the production time period as well as their delivery schedules. The application provides associates working in the consolidation center with information on the types and sequence of carts for each train and further, which part containers to load on each cart of an assembled train. The DMS application also provides information on where to deliver the part containers on the production line. The application generates a "cart master label" or CML 102 for each cart that facilitates the selection of parts to deliver to the production line. The information regarding the train configurations, the containers/parts on the train, and the delivery locations and schedule is linked in the DMS application so that parts deliveries can be confirmed and recorded in the DMS application.

Each cart on a train 116, 118 has a CML that identifies the parts to be loaded on the cart and the delivery locations and times for the parts loaded on the cart. Carts of the same or different types are linked according to a sequence determined by the DMS application and then loaded with the parts identified on the CML. As trains are configured for parts delivery, the cart license plates 106 and CML 104 are scanned to link and register them with the DMS application. The scanned data are compared to the CML to confirm that the correct cart types have been linked for the planned parts delivery. The CML is then placed in a plastic sleeve on the cart to facilitate the selection or "picking" of parts and delivery of them to the production line.

Figure 2:
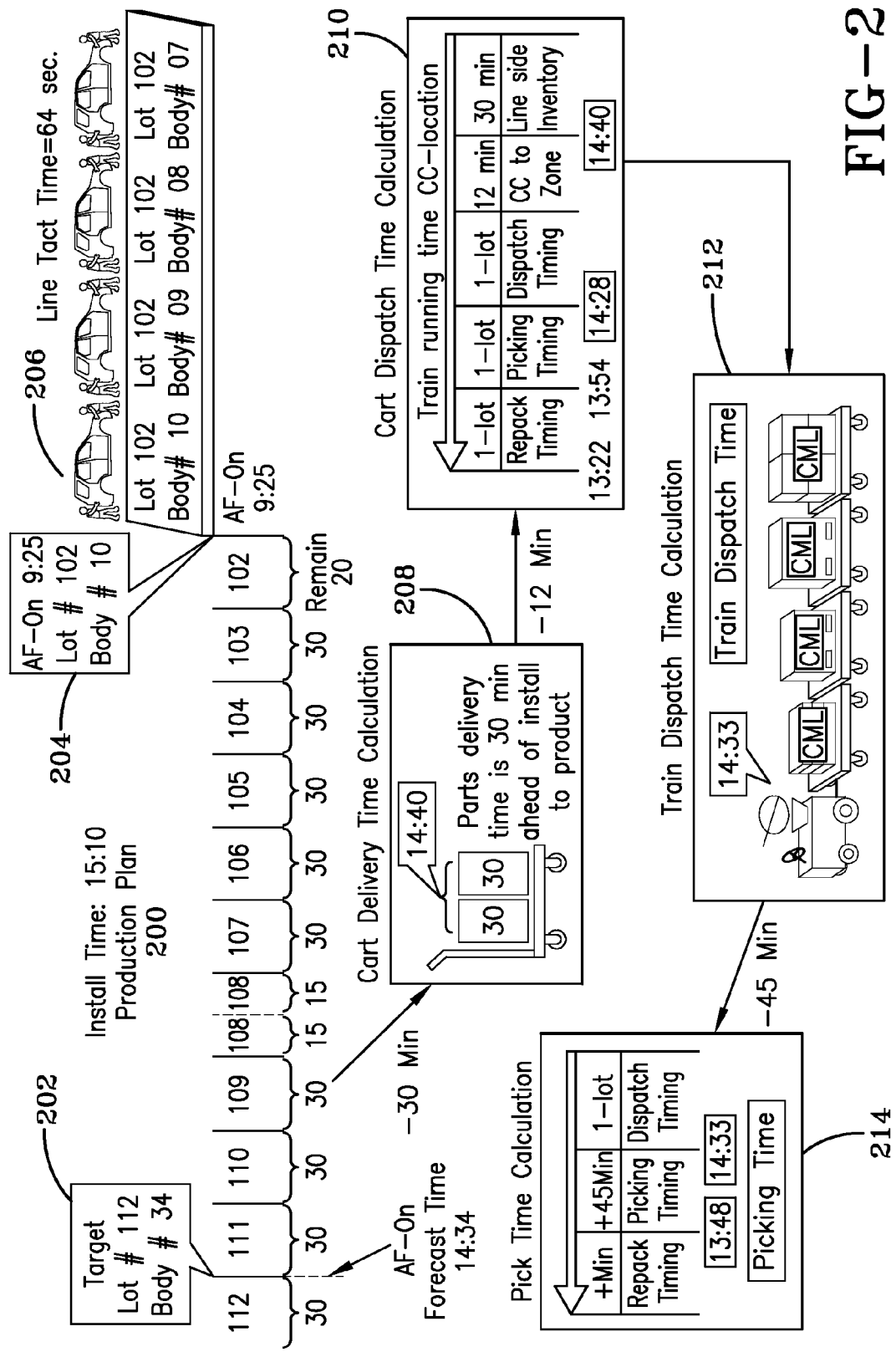
FIG. 2 is a schematic for calculating a dynamic train building schedule according to an example embodiment of the present invention.

Parts are delivered to the production line on demand. Referring to FIG. 2, a schematic for calculating a dynamic train building schedule according to an example embodiment is shown. The production plan or schedule 200 indicates when various production lots are estimated to start. For example, production for the plan shown in FIG. 2 begins at 9:25 with Lot #102 at line location 10 204. The forecast time for the beginning of Lot #112 is 14:34 202. For each production line location, an estimated install time is determined. For example, assuming the manufacturer's tact time is 64 seconds 206, parts at line location 34 are required 36 minutes after production on the specified lot begins (64 seconds×34 line locations). Thirty-six minutes after the start of the lot run (14:34) results in an estimated install time of 15:10. Assuming a parts delivery time of 30 minutes ahead of the installation time of 15:10 results in a "cart delivery time" 208 calculation of 14:40. Next, a cart dispatch time of 14:28 is determined 210 based on an assumption that 12 minutes are needed for the cart to travel from the consolidation center to line location 34. A train dispatch estimate is determined using a table as shown below.

TABLE 1

Train Dispatch Time Calculation

| ID (1) | Value (2) | Total (3) | LOC (4) | SEQ (5) | QTY (6) | Dispatch Scheduled Time ==> Enable Delayed (5 min.) (7) | | | | | |
|---|---|---|---|---|---|---|---|---|---|---|---|
| A | 1.5 | 1.5 | 024 | 3 | 30 | 14:24 | | 14:40 | | | |
| B | 1.0 | 2.5 | 016 | 2 | 60 | | 14:27 | | 14:43 | | |
| C | 1.2 | 3.7 | 034 | 5 | 30 | | | 14:28 | | 14:44 | |
| D | 1.0 | 4.7 | 008 | 1 | 120 | | | | 14:32 | | 14:46 |
| E | 1.2 | 5.7 | 033 | 4 | 30 | | | | 14:33 | | 14:50 |
| F | 1.0 | 6.7 | 002 | — | 30 | | | | | 14:42 | 14:52 |

The train dispatch or delivery schedule comprises cart data indicating the types of carts to be linked for each train and the sequence of carts. Each cart that may be used on a train is assigned a cart size ratio value [Value (2)] that indicates its size in relation to a standard cart that is assigned a value of 1. For example, as shown in Table 1, a type C cart has a value of 1.2 which means it is 20% larger than a type B cart which is a standard size cart. The cart size values are used to determine a total cart size [Total (3)]. The total number of carts on a train may be limited according to this value which takes into account the relative sizes of the cart types. For example, trains may be limited to seven carts or fewer. The table also indicates the delivery locations for each cart [LOC (4)], sequence number for the cart's location in the train [SEQ (5)], container quantity [QTY (6)], and dispatch scheduled time[(7)]. The table shows that the times between 14:33 and 14:39 are available for dispatch so the train dispatch time 212 is the earlier time of 14:33. Forty-five minutes are allocated to pick the part containers to load on the carts so the scheduled pick time 214 is 13:48.

Figure 3:
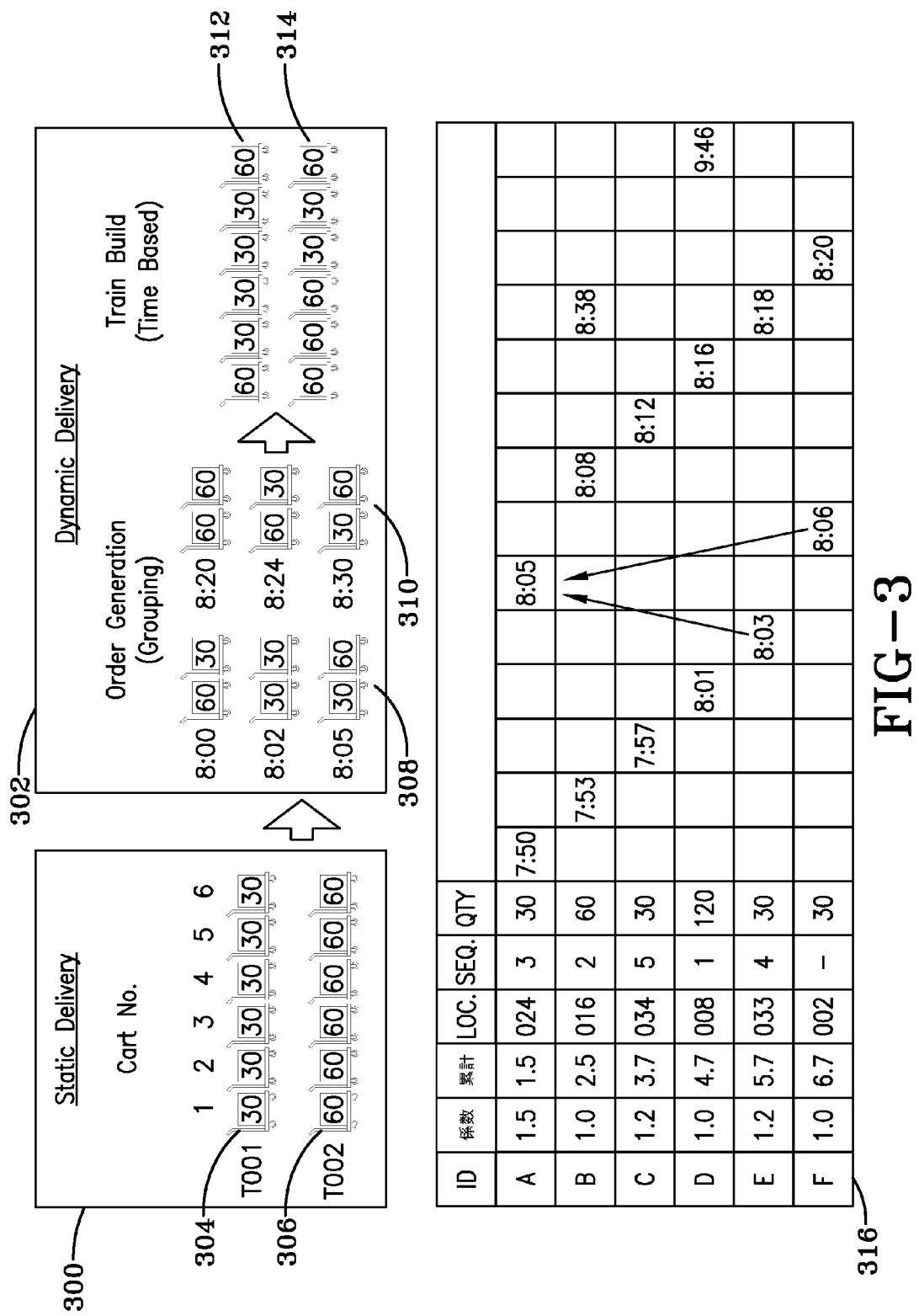
FIG. 3 is a schematic illustrating dynamic train building and delivery according to an example embodiment of the present invention.

Referring to FIG. 3, a schematic illustrating dynamic train building and delivery according to an example embodiment is shown. In a static delivery system 300, carts of the same type 304, 306 are loaded with containers holding the same number of parts and dispatched to the production line for parts delivery. Using a dynamic delivery approach 302, parts are delivered according to demand as determined by a production schedule. An order generation process determines the groupings of carts and containers 308, 310 according to when the parts are needed on the production line. The cart groupings are then linked into trains 312, 314 that deliver parts line side according to the dispatch schedule. As shown in FIG. 3, carts holding different parts are linked together to form trains. The table in FIG. 3 316 illustrates the procedure for determining a dispatch time for each train.

Figure 4:
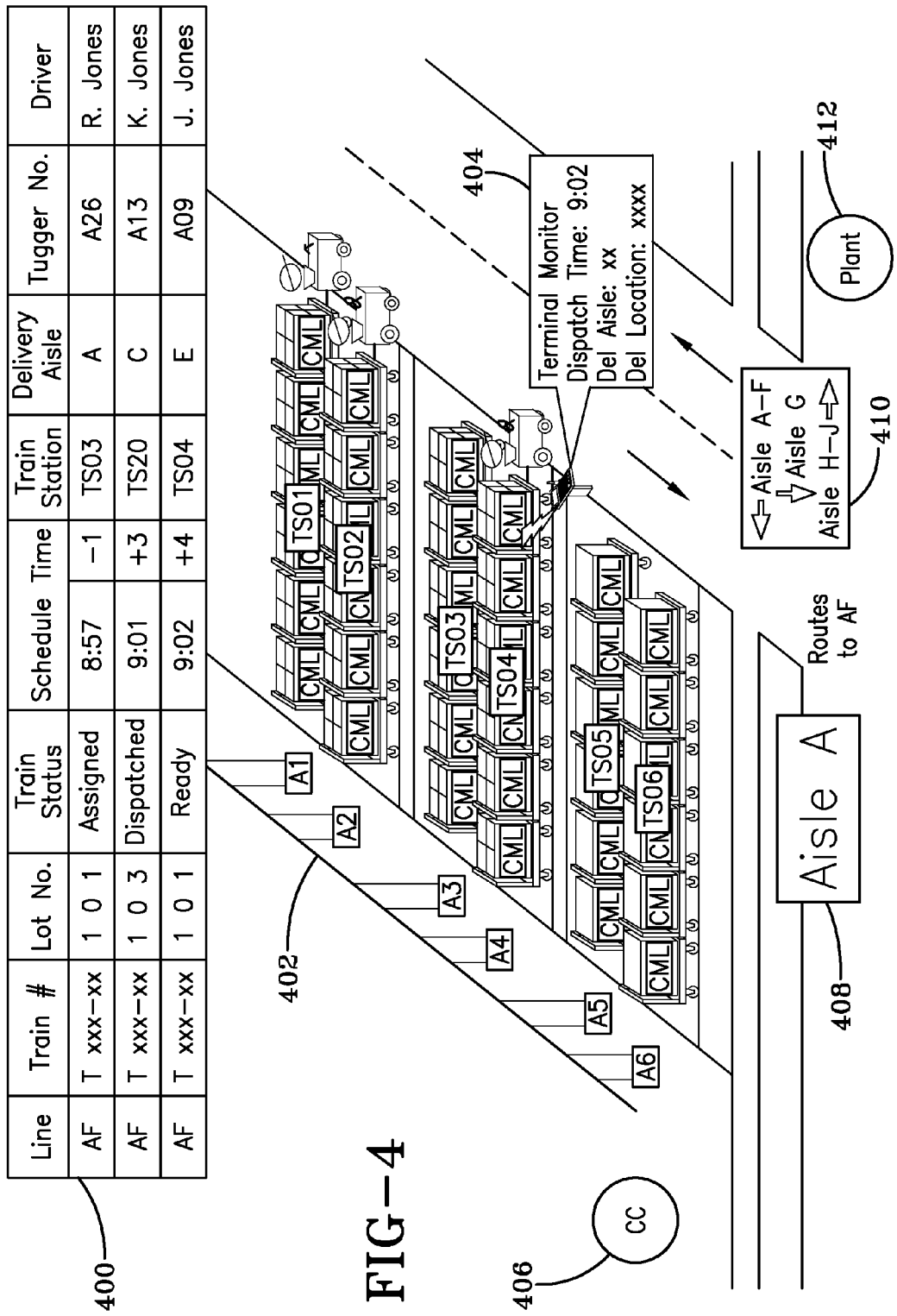
FIG. 4 is a diagram illustrating the flow of parts from a consolidation center staging area to an assembly plant for an example embodiment of the present invention.

Referring to FIG. 4, a diagram illustrating the flow of parts from a consolidation center staging area 406 to an assembly plant for an example embodiment is shown. Train drivers return empty containers to a returnable container center and then respond to the DMS application with their availability.

The DMS application directs the train drivers to a parts staging area according to station number (e.g., TS01-TS06). The driver scans the CML to verify the assignment. If a driver arrives at a station more than three minutes ahead of the scheduled dispatch time, the train is not released. The driver then scans the CML again as the actual dispatch time approaches so that the train will be released.

After the CML is scanned within the established tolerance for the dispatch time, its status in the DMS application is changed from "assigned" to "dispatched." A status display 400 in the terminal shows the status of each train deployed to deliver parts line side. The status display provides the following information:

TABLE 2

Status Display

| Status Display Field | Description |
| --- | --- |
| Line | Assembly plant production line assigned to train |
| Train Number | Unique identifier for train |
| Lot Number | Current lot under production. |
| Train Status | Indicator: Scheduled Build, Building, Built, Picking & Packing, Ready, Assigned, Dispatched, Delivered. |
| Scheduled Departure Time | Scheduled departure time and delay indicator |
| Train Station | Where train has been assembled |
| Delivery Aisle | Where parts are to be delivered |
| Transporter Number | Transporter assigned to train |
| Driver | Driver assigned to transporter |

A driver uses a "terminal monitor" 404 bar code reader to scan the CML. Other devices for communicating with drivers such as overhead display boards 402 may be used as well. The scanner is loaded with instructions for the driver and shows the dispatch time as well as the routes to the production line (delivery aisle) and to the line side location (delivery location) of the first cart to be delivered (which is the last cart attached to the train). The terminal may be configured with directional information 408, 410 (e.g., signage or displays) to assist the transporter drivers in finding the various production lines and locations in the assembly plant 412.

Figure 5:
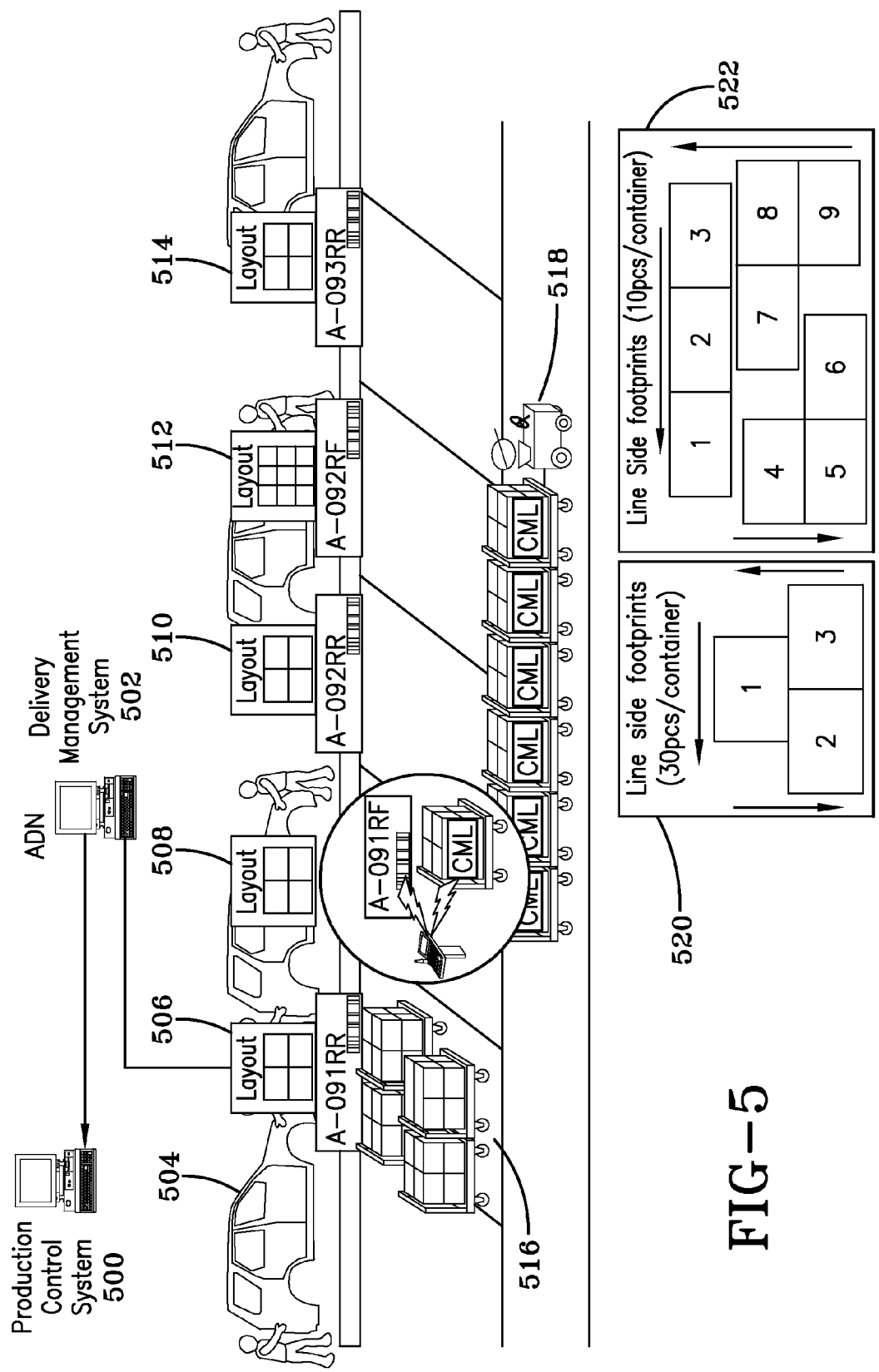
FIG. 5 is a diagram illustrating the flow of parts data between computer systems for an example embodiment of the present invention.

Referring to FIG. 5, a diagram illustrating the flow of parts data between computer systems for an example embodiment is shown. The DMS application 502 communicates "advance delivery notices" (ADNs) to a manufacturer production control system 500 to facilitate the tracking of parts are they are delivered to the production line. The ADNs are created and sent from the DMS 502 to the production control system 500 when each train delivery is complete. An inventory transfer of parts communication is also triggered to reflect the change in inventory from a consolidation center location to a production line side location.

As parts are delivered line side, the CML or cart license plate is scanned to confirm that the parts are at the appropriate line side location as determined by the DMS application. At each line side location 504, 506, 508, 510, 512, 514, a different line side footprint may be used to accommodate the containers that hold the parts that are delivered line side. One line side footprint may be used for containers holding 30 parts each 520 while another line side footprint is used for containers holding 10 parts each 522. For example, in the layout 520 position 3 is vacant, position 1 is in-process, and position 2 is for the empty cart/containers. As shown in FIG. 5, a nine slot layout may also be deployed. In the nine slot configuration, several slots may be vacant, several slots may hold parts for the next lot, and several slots may hold parts for use in the current lot. CMLs or cart license plates are scanned as they are delivered line side 516 by the transporter 518 that travels along the production line.

Empty carts are also collected and returned from the assembly plant to the consolidation center. Scanning the CML of the last cart on a train causes the driver's terminal monitor to instruct the driver to collect empty carts. The scanner directs the driver to the carts by line location. The driver scans the cart license plate of each cart at the specified line location. The empty containers are collected starting with the last delivery line location and progressing to the first one. The data is communicated to the DMS application and allows it to track each cart's status and location.

Figure 6:
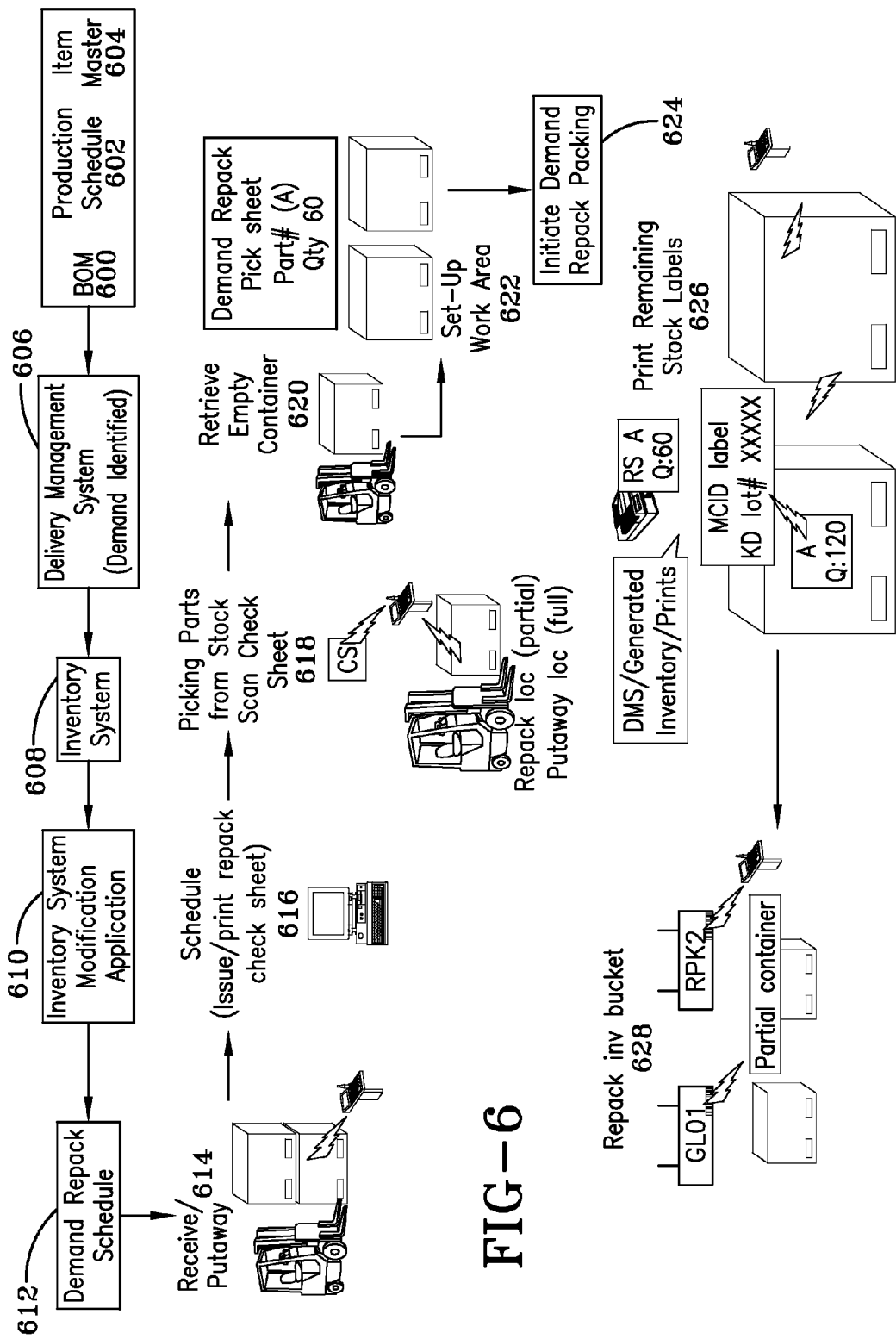
FIG. 6 is a flow diagram illustrating a demand repack operation according to an example embodiment of the present invention.

Referring to FIG. 6, a flow diagram illustrating a demand repack operation according to an example embodiment is shown. Parts may be repacked in different sizes or types of containers to increase efficiency in the use of carts and trains and at the same time, to meet production schedule requirements based on actual demand. Using bill of materials (BOM) data 600, production schedule data 602, and item master data 604, the DMS application generates a parts demand schedule. BOM data identifies the materials used to build different products while item masters data 604 identifies the actual parts needed to manufacture the different products identified in the production schedule. The DMS application 606 then determines what parts are needed and when they are needed throughout the production time period for one or more lots of the different products to be manufactured. The part demand data as determined by the DMS application 606 is then communicated to an inventory management system 608 and to an inventory management system modification application 610 so that parts can be ordered and in some cases, inventoried to meet the requirements defined in the production schedule. A "demand repack schedule" operation 612 is performed to determine whether containers can be used more efficiently to meet the actual production schedule requirements. For example, parts that are packaged by suppliers in 120 unit containers may be repacked for 30 unit deliveries line side.

Initially, parts maybe stored in standard packaging in a standard location until the DMS application determines a need for a part quantity that is less than the package quantity received from the OME supplier 614. First, a new repack schedule for the parts is generated 616. A new repack check sheet is issued and then used to pick parts from a current stock 618. The new check sheet is scanned 618 and empty containers are retrieved 620 if they are needed to deliver the parts listed in the new check sheet. The parts are packed in a work area within the consolidation center to complete the repack operation 622. Parts that have been allocated to production are used first in the repack operation 624. Parts are then selected from inventory to complete the repack task.

New labels are printed 626 so that the repacked part containers can be delivered line side in conjunction with parts in other containers that are received from suppliers and ready to be delivered line side. The new labels reflect the container quantity changes. For example, 120 units of part A initially held in a first container may be repacked to two containers holding 60 units each. In addition, multiple parts may be placed in one container. Information about the repacked parts is communicated to the other computer systems 628 so that the status and location of parts is known.

Figure 7:
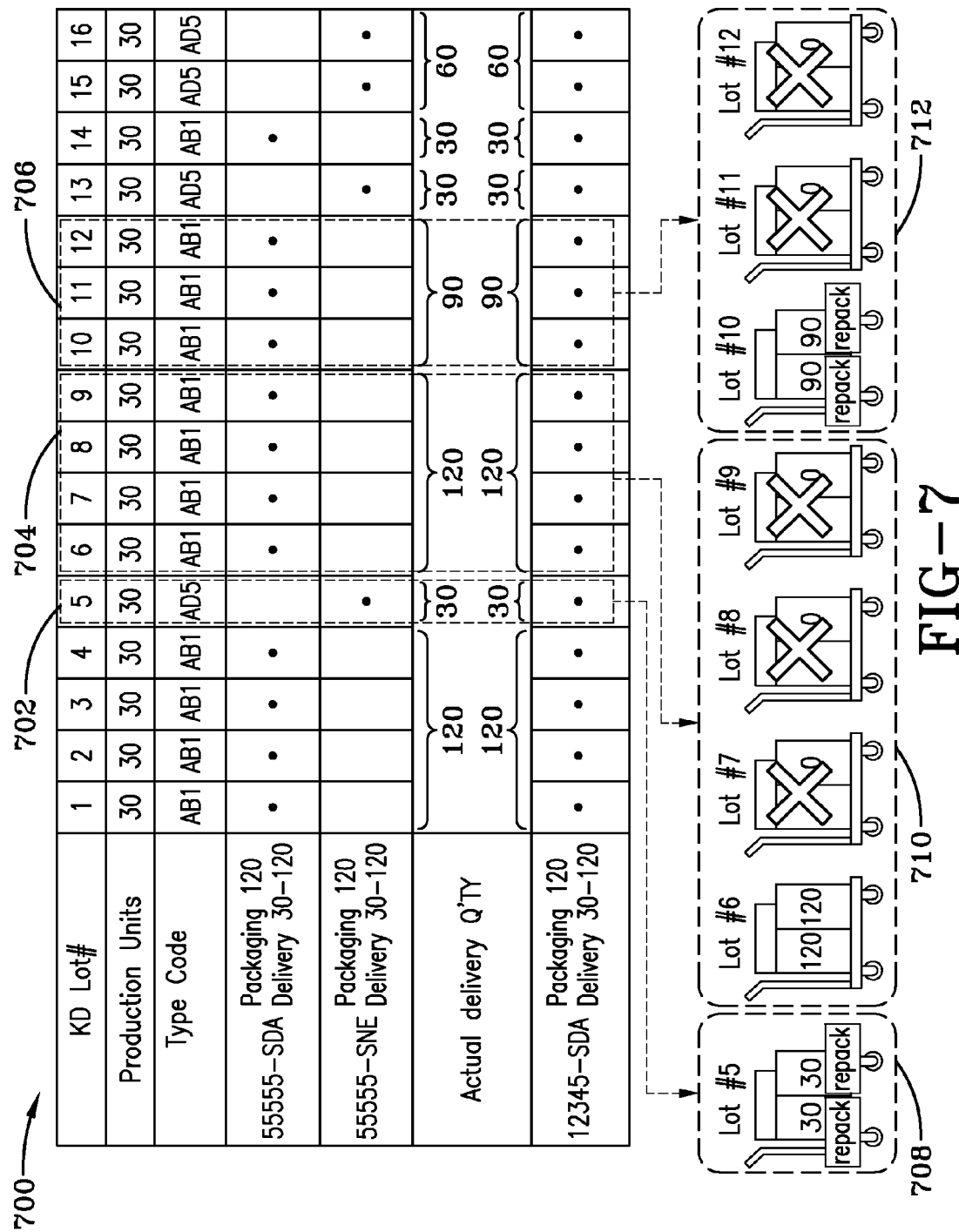
FIG. 7 is a schematic illustrating the repack operation according to an example embodiment of the present invention.

Referring to FIG. 7, a schematic illustrating the repack operation according to an example embodiment is shown.

Repack operations may be used to deliver quantities of parts line side that are needed to complete a series of lots for a particular product. The DMS application tracks information about repack operations and deliveries so that parts in needed quantities are delivered line side. The diagram 700 shows details related to a series of lots and the part quantities needed for each lot. If the product type under production does not change for several lots, the DMS application may arrange to deliver a quantity of parts sufficient to complete several lots. For example, the DMS application may determine that for product type AD5, quantities of 30 part number 5555-SNE and 12345-SDA 708 are needed for KD Lot #5 702. KD Lots #6-9 704 require quantity 120 of parts 55555-SDA and 12345-SDA (30 parts per lot) so a delivery of 120 parts is made when Lot #6 starts 710. Additional deliveries of the parts for Lots #7-9 are not required. Lots #10-12 706 require quantity 30 of parts 55555-SDA and 12345-SDA so a quantity of 90 parts is delivered when Lot #10 starts 712. Additional deliveries of the parts for Lots #11 and 12 are not required.

The repack operation supports delivery of the appropriate number of parts line side without leftover parts when the product type under production changes. It matches quantities and product types so that the number of parts delivered line side is the exact number that is needed according to the production schedule. It further minimizes the number of line side deliveries that are required to complete the production run and therefore, makes more efficient use of the trains and carts. Supplies may be ordered according to standard packaging quantities but the repack operation supports line side deliveries of parts based on actual production demand.

Referring to FIG. 8, a schematic for a short parts operation according to an example embodiment is shown. Parts may be identified as "short" within the consolidation center 808 or in the assembly plant 810. Parts needed line side may be "short" for a variety of reasons. The inventory management system modification application 800 communicates with the production system 802 and assists in identifying problems related to short parts. The reason for the parts short is determined 804 and a short type is assigned. A "short identified time line" 812 indicates how short types may be determined and assigned.

TABLE 3

Short Types

| Short Type | Description | Consolidation Center Time Line | Assembly Plant Time Line |
|---|---|---|---|
| True Short | No inventory for part on site | >4 hours | >2 hours |
| Potential Short | Demand pegging - part in inventory, location un-allocatable (Yard/Overstock) | 2-4 hours | |
| Critical Part Short | Pick/Pack Time Short - part missed at point of picking | 1-2 hours | <1 hour |

Once the short type is determined, the inventory control system modification application 806 assists in determining a possible resolution. For "true short" types, arrangements are made to order the needed part or parts. For "potential short" types, a potential short sheet identifying the needed parts is generated. The short sheet may provide information useful in resolving the shortage. Finally, for a "critical part short" type, a short sheet and cycle count sheet are generated identifying where the parts may be located. The parts may then be picked and packed for line side delivery.

A user of the inventory control system modification application may review a "short parts summary" screen to view information about short parts. Visual indicators such as bold text and italicized text may be used to quickly communicate information about short parts.

SHORT PARTS SUMMARY                                                                                  09/26/2008 13:38

Wh/CO/DV: XXX XXX XXXXXXXX
Press 1 and Enter to view details    Critical Parts (CPI), Potential Short, *True Short*

| Opt | CTRL# | Supplier | Part # | Color | Qty | Lot | Pick/Train | CST |
|---|---|---|---|---|---|---|---|---|
| — | C99999 | 99999999 | XXXXX | XXXXX | 99999 | XXXXX | XX/XX | XX:XX |
|   | XXXXXXXXXXXXXX | XXXXXXXXXXX | | St:XXXXXXXXXXXXXXXXX | | | | Cd:X |
| — | C99999 | 99999999 | XXXXX | XXXXX | 99999 | XXXXX | XX/XX | XX:XX |
|   | XXXXXXXXXXXXXX | XXXXXXXXXXX | | St:_____ | | | | Cd:X |
| — | C99999 | 99999999 | XXXXX | XXXXX | 99999 | XXXXX | XX/XX | XX:XX |
|   | XXXXXXXXXXXXXX | XXXXXXXXXXX | | St:_____ | | | | Cd:X |
| — | P99999 | 99999999 | XXXXX | XXXXX | 99999 | XXXXX | XX/XX | XX:XX |
|   | XXXXXXXXXXXXXX | XXXXXXXXXXX | | St:_____ | | | | Cd:X |
| — | *T99999* | *99999999* | *XXXXX* | *XXXXX* | *99999* | *XXXXX* | *XX/XX* | |
|   | *XXXXXXXXXXXXXX* | *XXXXXXXXXXX* | | *St:XXXXXXXXXXXXXXXXX* | | | | *Cd:X* |
| — | T99999 | 99999999 | XXXXX | XXXXX | 99999 | XXXXX | XX/XX | XX:XX |
|   | XXXXXXXXXXXXXX | XXXXXXXXXXX | | St:_____ | | | | Cd:X |

The DMS application of the present invention allows a manufacturer to implement a "parts pipeline" to facilitate the delivery of need parts to different locations on a production line. The DMS and the inventory control system modification applications supports picking and packing of parts in returnable containers and delivery of the containers to line side locations using trains that pull multiple carts organized according to production schedule parts demand. The DMS application determines an appropriate ordering of the carts for each train and communicates detailed instructions to the train drivers and other associates working in the consolidation center. Parts within the "pipeline" flow from the consolidation center to the assembly plant line locations according to demand. The DMS and the inventory control system modification applications track the status and location of parts and alerts associates working in the consolidation to any problems that disrupt the parts flow. The parts delivery management system and method of the present invention meets the goals described above and allows an associate to continue concentrating on his or work while the manufactured products pass on the assembly line.

An exemplary embodiment of a computerized parts delivery management system has been shown and described above. It should be realized by one skilled in the art that various modifications may be made to the DMS application described above as well as types of vehicles used to delivery parts line side. Therefore, while certain embodiments of the present invention are described in detail above, the scope of the invention is not to be considered limited by such disclosure, and modifications are possible without departing from the spirit of the invention as evidenced by the following claims:

What is claimed is:

1. A computerized system for managing deliveries of parts from a consolidation center to locations on a manufacturer's production line comprising:
   (A) a plurality of containers holding parts for use in assembling products on said manufacturer's production line;
   (B) a plurality of carts for transporting said containers to said manufacturer's production line;
   (C) a delivery management system computer that:
      (1) receives from a production control computer production parts and schedule data that identifies parts needed to manufacture products on said manufacturer's production line for a production time period;
      (2) executes a delivery management system application that:
         (a) determines when said parts are needed on said manufacturer's production line for said production time period using said production parts and schedule data;
         (b) generates a delivery schedule for dispatching trains comprising a plurality of carts with containers of parts for delivering parts to said manufacturer's production line, said delivery schedule comprising:
            (i) an identifier for each train;
            (ii) a sequence number for each cart's location in each train;
            (iii) a production line delivery location for each cart in each train;
            (iv) a dispatch time for each train; and
            (v) container data identifying containers of parts to be loaded on each cart in each train; and
   (D) a plurality of trains each comprising a plurality of carts ordered according to said sequence number for each cart's location in each train;
   (E) a device for communicating from said delivery management system computer to a driver assigned to each of said trains instructions for:
      (1) loading containers on each cart of a train according to said container data in said delivery schedule;
      (2) leaving said consolidation center according to said dispatch time for said train; and
      (3) delivering each container on a cart to a production line delivery location identified in said delivery schedule.

2. The system of claim 1 wherein said plurality of carts are of different types.

3. The system of claim 2 wherein each different type of said plurality of carts is adapted to hold a specific type of container.

4. The system of claim 1 wherein said plurality of carts is selected from group consisting of flat carts and shelf carts.

5. The system of claim 1 wherein said device for communicating from said delivery management system computer to a driver is a bar code reader.

6. The system of claim 1 wherein said delivery management system computer generates cart master labels comprising delivery schedule data for each cart and said cart master labels are attached to a respective cart.

7. The system of claim 1 wherein said delivery management system computer communicates advance delivery notices to said production control computer.

8. The system of claim 1 wherein said consolidation center is co-located in a facility with said manufacturer's production line.

9. The system of claim 1 wherein plurality of containers holding parts for use in assembling products on said manufacturer's production line comprises containers received from suppliers with parts and containers repacked at said consolidation center according to parts demand data.

10. A computerized method for managing deliveries of parts from a consolidation center to locations on a manufacturer's production line comprising:
    (a) receiving at a delivery management system computer from a production control computer production parts and schedule data identifying parts needed to manufacture products on said manufacturer's production line for a production time period;
    (b) determining at said delivery management system computer when said parts are needed on said manufacturer's production line for said production time period using said production parts and schedule data;
    (c) generating at said delivery management system computer a delivery schedule for dispatching trains comprising a plurality of carts with containers of parts for delivering parts to said manufacturer's production line, said delivery schedule comprising:
       (i) an identifier for each train;
       (ii) a sequence number for each cart's location in each train;
       (iii) a production line delivery location for each cart in each train;
       (iv) a dispatch time for each train; and
       (v) container data identifying containers of part to be loaded on each cart in each train; and
    (d) ordering carts for each train according to said sequence number for each cart's location in each train;
    (e) loading containers on each cart of a train according to said container data in said delivery schedule; and
    (f) initiating delivery of said carts to said production line delivery locations identified in said delivery schedule according to said dispatch time for each train.

11. The method of claim 10 wherein said plurality of carts are of different types.

12. The method of claim 11 wherein each different type of said plurality of carts is adapted to hold a specific type of container.

13. The method of claim 10 wherein said plurality of carts is selected from the group consisting of flat carts and shelf carts.

14. The method of claim 10 further comprising communicating deliver instructions from said delivery management system computer to drivers of said trains using a bar code reader.

15. The method of claim 10 further comprising generating cart master labels comprising delivery schedule data for each cart and attaching said cart master labels to a respective cart.

16. The method of claim 10 further comprising communicating advance delivery notices from said delivery management system computer to said production control computer.

17. The method of claim 10 wherein said consolidation center is co-located in a facility with said manufacturer's production line.

18. The method of claim 10 wherein loading containers on each cart of a train comprises loading containers received from suppliers with parts and loading containers repacked at said consolidation center according to parts demand data.

\* \* \* \* \*